US005850680A

United States Patent [19]

Verrier et al.

[11] Patent Number: 5,850,680

[45] Date of Patent: Dec. 22, 1998

[54] DISK BRAKE ASSEMBLY TOOL

[76] Inventors: Theresa Verrier; James Verrier, both of 5 Clark Rd., Stony Point, N.Y. 10980

[21] Appl. No.: 15,109

[22] Filed: Jan. 29, 1998

[51] Int. Cl.$^6$ .................................................... B23P 19/04

[52] U.S. Cl. ................................ 29/257; 29/258; 29/276; 29/278; 269/249

[58] Field of Search ............................ 29/257, 256, 258, 29/260, 276, 278, 239; 269/143, 249, 212

[56] References Cited

U.S. PATENT DOCUMENTS

| | | | |
|---|---|---|---|
| 2,965,958 | 12/1960 | Gribble | 29/257 |
| 4,837,915 | 6/1989 | Willms | 29/276 |
| 4,962,918 | 10/1990 | Yang | 269/249 |
| 5,018,261 | 5/1991 | Markous | 29/239 |

*Primary Examiner*—David A. Scherbel

[57] ABSTRACT

A new disc brake assembly tool for providing an easy means for positioning a piston into the piston cylinder of a caliper to provided proper clearance so that a disc brake pad may be installed. The inventive device includes a base having an elongate center 1t portion, an arm portion, and a foot portion. The arm and foot portions are extended substantially perpendicular from the center portion and are spaced apart from one another. A mount member is coupled to the terminal end of the arm portion. The mount member has a mount bore extending therethrough. Inserted through the mount bore is a tubular sleeve having a threaded lumen. the sleeve being positionable within the mount bore between an extended position and a retracted position. The proximal end of the sleeve has a radial flange outwardly extending therefrom. An elongate threaded rod is threadingly extended through the threaded lumen of the sleeve with the distal end of the threaded rod extending from the distal end of the sleeve and its proximal end extending from the proximal end of the sleeve. The threaded rod is threaded in the sleeve so that it is expendable towards the foot portion. A second biasing assembly biases the sleeve away from the foot portion. The foot portion has a slot therethrough between its surfaces which extends from the terminal end of the foot portion towards the central portion. The threaded lumen of sleeve is aligned with the slot such that the longitudinal axis of the lumen extends through a portion of the slot so that the proximal end of the threaded rod is extendable through the slot of the foot portion.

13 Claims, 7 Drawing Sheets

DISK BRAKE ASSEMBLY TOOL

BACKGROUND OF THE INVENTION

1. Field of the Invention

The present invention relates to brake tools and more particularly pertains to a new disc brake assembly tool for providing an easy means for positioning a piston into the piston cylinder of a caliper to provided proper clearance so that a disc brake pad may be installed. 2. Description of the Prior Art The use of brake tools is known in the prior art. More specifically, brake tools heretofore devised and utilized arc known to consist basically of familiar, expected and obvious structural configurations, notwithstanding the myriad of designs encompassed by the crowded prior art which have been developed for the fulfillment of countless objectives and requirements.

Known prior art brake tools include U.S. Pat. No. 4,903,391; U.S. Pat. No. 4,831,904; U.S. Pat. No. 4,845,823; U.S. Pat. No. 5,140,734; U.S. Pat. No. 5,018,261; and U.S. Pat. No. Des. 255,643.

Commonly, some prior art tools are mountable to a ratchet. This is a problem because, in most cases, the piston of a disc brake assembly does not rotate that easily within the piston cylinder of the caliper of a disc brake assembly.

Other commonly found problem in prior art tools is that they do not secure on to the caliper so that these prior art tools provide little leverage when positioning the piston into the piston cylinder of the caliper of a disc brake assembly and constantly slips off to cause damage to the piston.

Another common problem of prior art tools occurs when a piston of a disc brake assembly extends too far out of its piston cylinder of the caliper of the disc brake assembly. In this situation, prior art tools are difficult to fit into the caliper and require several hands to operate thereby leaving no free hand to support the caliper.

While these devices fulfill their respective, particular objectives and requirements, the aforementioned patents do not disclose a new disc brake assembly tool. The inventive device includes a base having an elongate center portion, an arm portion, and a foot portion. The arm and foot portions are extended substantially perpendicular from the center portion and are spaced apart from one another. A mount member is coupled to the terminal end of the arm portion. The mount member has a mount bore extending therethrough. Inserted through the mount bore is a tubular sleeve having a threaded lumen. the sleeve being positionable within the mount bore between an extended position and a retracted position. The proximal end of the sleeve has a radial flange outwardly extending therefrom. An elongate threaded rod is threadingly extended through the threaded lumen of the sleeve with the distal end of the threaded rod extending from the distal end of the sleeve and its proximal end extending from the proximal end of the sleeve. The threaded rod is threaded in the sleeve so that it is extendable towards the foot portion. A second biasing assembly biases the sleeve away from the foot portion. The foot portion has a slot therethrough between its surfaces which extends from the terminal end of the foot portion towards the central portion. The threaded lumen of sleeve is aligned with the slot such that the longitudinal axis of the lumen extends through a portion of the slot so that the proximal end of the threaded rod is extendable through the slot of the foot portion.

In these respects, the disc brake assembly tool according to the present invention substantially departs from the conventional concepts and designs of the prior art, and in so doing provides an apparatus primarily developed for the purpose of providing an easy means for positioning a piston into the piston cylinder of a caliper to provided proper clearance so that a disc brake pad may be installed.

SUMMARY OF THE INVENTION

In view of the foregoing disadvantages inherent in the known types of brake tools now present in the prior art, the present invention provides a new disc brake assembly tool construction wherein the same can be utilized for providing an easy means for positioning a piston into the piston cylinder of a caliper to provided proper clearance so that a disc brake pad may be installed.

The general purpose of the present invention, which will be described subsequently in greater detail, is to provide a new disc brake assembly tool apparatus and method which has many of the advantages of the brake tools mentioned heretofore and many novel features that result in a new disc brake assembly tool which is not anticipated, rendered obvious, suggested, or even implied by any of the prior art brake tools, either alone or in any combination thereof.

To attain this, the present invention generally comprises a base having an elongate center portion, an arm portion, and a foot portion. The arm and foot portions arc extended substantially perpendicular from the center portion and are spaced apart from one another. A mount member is coupled to the terminal end of the arm portion. The mount member has a mount bore extending therethrough. Inserted through the mount bore is a tubular sleeve having a threaded lumen. the sleeve being positionable within the mount bore between an extended position and a retracted position. The proximal end of the sleeve has a radial flange outwardly extending therefrom. An elongate threaded rod is threadingly extended through the threaded lumen of the sleeve with the distal end of the threaded rod extending from the distal end of the sleeve and its proximal end extending from the proximal end of the sleeve. The threaded rod is threaded in the sleeve so that it is extendable towards the foot portion. A second biasing assembly biases the sleeve away from the foot portion. The foot portion has a slot therethrough between its surfaces which extends from the terminal end of the foot portion towards the central portion. The threaded lumen of sleeve is aligned with the slot such that the longitudinal axis of the lumen extends through a portion of the slot so that the proximal end of the threaded rod is extendable through the slot of the foot portion.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new disc brake assembly tool apparatus and method which has many of the advantages of the brake tools mentioned heretofore and many novel features that result in a new disc brake assembly tool which is not anticipated, rendered obvious, suggested, or even implied by any of the prior art brake tools, either alone or in any combination thereof.

It is another object of the present invention to provide a new disc brake assembly tool which may be easily and efficiently manufactured and marketed.

It is a further object of the present invention to provide a new disc brake assembly tool which is of a durable and reliable construction.

An even further object of the present invention is to provide a new disc brake assembly tool which is susceptible of a low cost of manufacture with regard to both materials and labor, and which accordingly is then susceptible of low prices of sale to the consuming public, thereby making such disc brake assembly tool economically available to the buying public.

Still yet another object of the present invention is to provide a new disc brake assembly tool which provides in the apparatuses and methods of the prior art some of the advantages thereof, while simultaneously overcoming some of the disadvantages normally associated therewith.

Still another object of the present invention is to provide a new disc brake assembly tool for providing an easy means for positioning a piston into the piston cylinder of a caliper to provided proper clearance so that a disc brake pad may be installed.

Yet another object of the present invention is to provide a new disc brake assembly tool which includes a base having an elongate center portion, an arm portion, and a foot portion. The arm and foot portions are extended substantially perpendicular from the center portion and are spaced apart from one another. A mount member is coupled to the terminal end of the arm portion. The mount member has a mount bore extending therethrough. Inserted through the mount bore is a tubular sleeve having a threaded lumen. the sleeve being positionable within the mount bore between an extended position and a retracted position. The proximal end of the sleeve has a radial flange outwardly extending therefrom. An elongate threaded rod is threadingly extended through the threaded lumen of the sleeve with the distal end of the threaded rod extending from the distal end of the sleeve and its proximal end extending from the proximal end of the sleeve. The threaded rod is threaded in the sleeve so that it is extendable towards the foot portion. A second biasing assembly biases the sleeve away from the foot portion. The foot portion has a slot therethrough between its surfaces which extends from the terminal end of the foot portion towards the central portion. The threaded lumen of sleeve is aligned with the slot such that the longitudinal axis of the lumen extends through a portion of the slot so that the proximal end of the threaded rod is extendable through the slot of the foot portion.

Still yet another object of the present invention is to provide a new disc brake assembly tool that is very stable while positioning a piston of a disc brake assembly into the piston cylinder of a caliper of a disc brake assembly.

Even still another object of the present invention is to provide a new disc brake assembly tool that is easy to position on the caliper of a disc brake assembly especially when the piston is extended very far out of piston cylinder of the caliper.

Even yet still another object of the present invention is to provide a new disc brake assembly tool that allows a user to have a hand free to support the caliper while using the tool.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figures 1, 2:
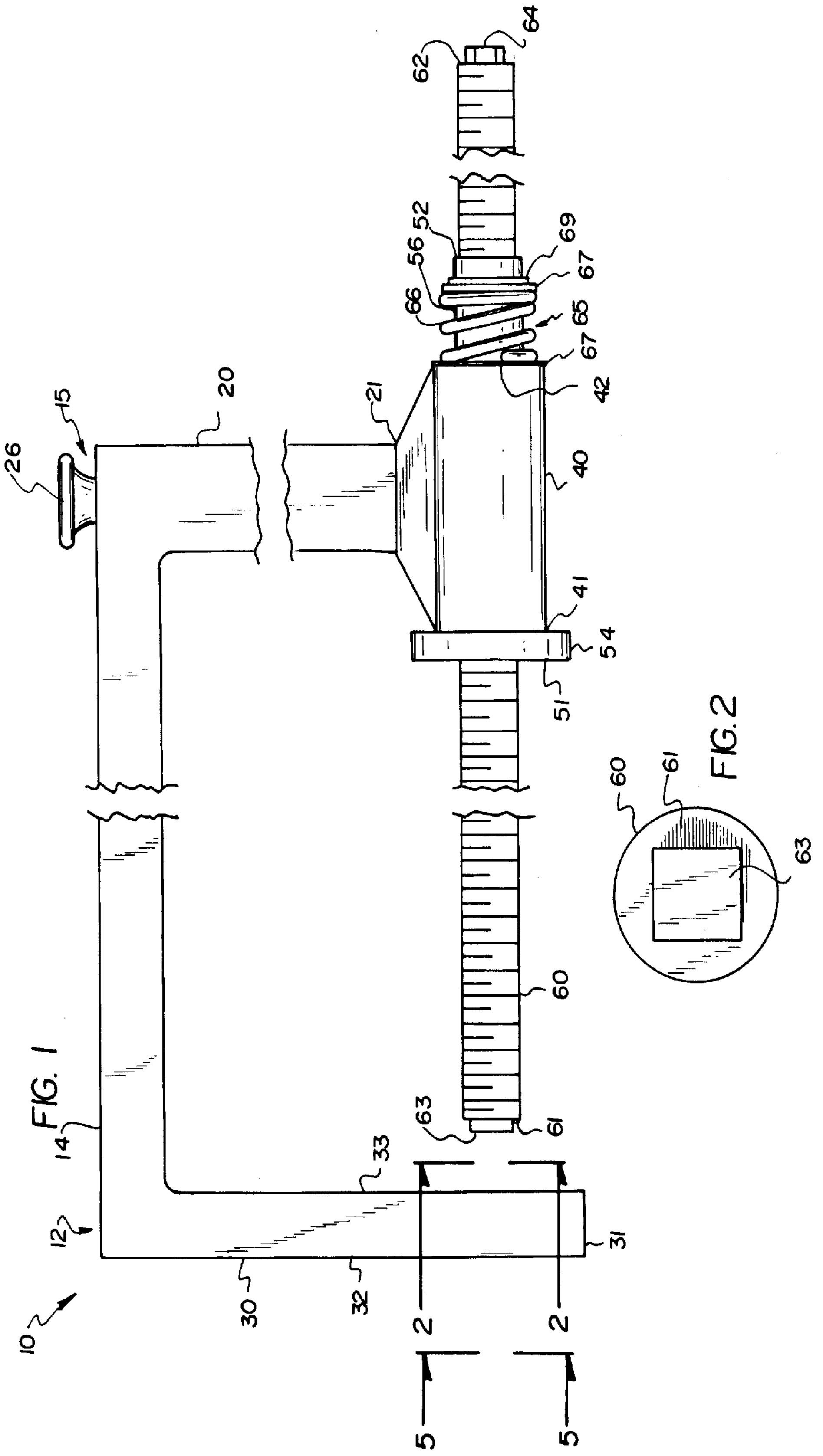
FIG. 1 is a schematic side view of a new disc brake assembly tool with the sleeve in the retracted position according to the present invention.
FIG. 2 is a schematic side view taken from line 2—2 of FIG. 1 of the proximal end of the threaded rod of the present invention.

With reference now to the drawings, and in particular to FIGS. 1 through 10 thereof, a new disc brake assembly tool embodying the principles and concepts of the present invention and generally designated by the reference numeral 10 will be described.

The disc brake assembly tool 10 is designed for use with a disc brake assembly 1 having a caliper body 2, a piston 3, and a break pad (not shown). The caliper body 2 has a piston cylinder 4 and a side wall 5 spaced apart from piston cylinder 4 to define a channel 6 for positioning the break pad. The side wall 5 also has an opening therethrough (not shown) into the channel 6 which is aligned with the piston cylinder 4. The piston 3 is disposable within the piston cylinder 4 and is extendable into the channel 6 of the caliper body 2. As best illustrated in FIGS. 1 through 10, the disc brake assembly tool 10 generally comprises a base 12 having an elongate center portion 14, an arm portion 20, and a foot portion 30. The arm and foot portions 20,30 are extended substantially perpendicular from the center portion 14 and are spaced apart from one another. A mount member 40 is coupled to the terminal end 21 of the arm portion 20. The mount member 40 has a mount bore 43 extending therethrough. Inserted through the mount bore 43 is a tubular sleeve 50 having a threaded lumen 43. the sleeve being positionable within the mount bore between an extended position and a retracted position. The proximal end 51 of the sleeve 50 has a radial flange 54 outwardly extending therefrom. An elongate threaded rod 60 is threadingly extended through the threaded lumen 53 of the sleeve 50 with the distal end 62 of the threaded rod 60 extending from the distal end 52 of the sleeve 50 and its proximal end 61 extending from the proximal end 51 of the sleeve 50. The threaded rod 60 is threaded in the sleeve 50 so that it is extendable towards the foot portion 30. A second biasing assembly 65 biases the sleeve 50 away from the foot portion 50. The foot portion 30 has a slot therethrough between its surfaces 32,33 which extends from the terminal end 31 of the foot portion 30 towards the central portion 14. The threaded lumen 53 of sleeve 50 is aligned with the slot 34 such that the longitudinal axis of the lumen 53 extends through a portion of the slot 34 so that the proximal end 61 of the threaded rod 60 is extendable through the slot 34 of the foot portion 30.

As illustrated in FIG. 1, the base 12 is generally C-shaped and has an elongate center portion 14, an arm portion 20, and a foot portion 30 spaced apart from the arm portion 20. The arm and foot portions 20,30 are extended substantially perpendicular from the center portion 14 and both terminate at a terminal end 21,31.

Figure 9:
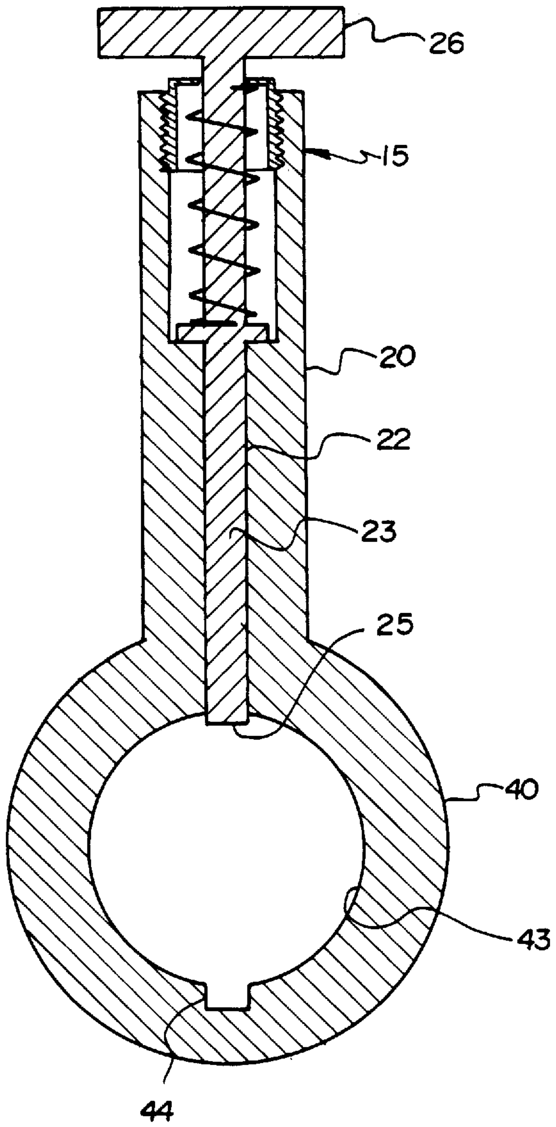
FIG. 9 is a schematic top side view of the mount member of the present invention.

The mount member 40 is coupled to the terminal end 21 of the arm portion 20. The mount member 40 has proximal and distal ends 41,42, and a cylindrical mount bore 43 extending through it that is generally parallel with the central portion 14. Preferably, as shown in FIG. 9, the mount bore 43 has an elongate groove 44 distal from the arm portion 20 extending along the length of the mount bore 43.

The tubular sleeve 50 has a threaded lumen 53, opposite proximal and distal ends 51,52, with the longitudinal axis of the lumen 53 of the sleeve 50 extending between the ends 51,52 of the sleeve 50. The sleeve 50 also preferably has proximal and distal portions 55,56 which are coaxially aligned with the proximal portion 55 preferably having a larger diameter than the distal portion 56 so that an abutment 57 is formed therebetween. The sleeve 50 is inserted through the mount bore 43 with its proximal end 51 extended towards the foot portion 30 and its distal portion 52 extended from the distal end 42 of the mount member. The outer surface of the proximal portion 55 of the sleeve 50 preferably has an elongate ridge 58 extending along the length of the proximal portion 55 which is disposed within the groove 44 of the mount bore 43. The proximal end 51 of the sleeve 50 has a radial flange 54 outwardly radially extending therefrom which is designed for stopping the proximal end 51 from being inserted into the mount bore 43.

Figure 4:
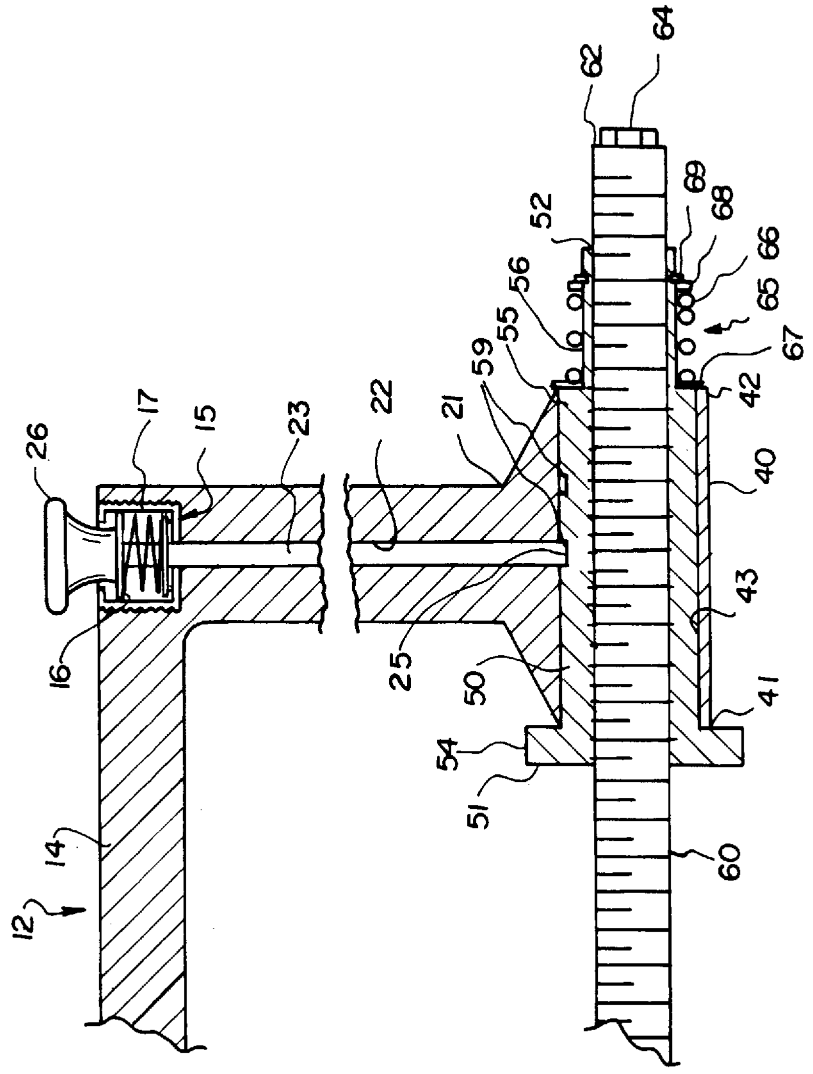
FIG. 4 is a schematic partial cross-sectional view of the present invention taken from line 4—4 on FIG. 3.

As shown in FIG. 4, the outer surface of the proximal portion 55 of the sleeve 50 also has a pair of spaced apart holes 59 which are orientated towards the arm portion 20 opposite the elongate ridge 58 of the proximal portion 55 of the sleeve 50. One of the holes 59 is located towards the proximal end 51 of the sleeve 50 while the other hole 59 is located towards the distal end 52 of the sleeve 50. The holes 59 are designed for inserting a slide pin into for holding the sleeve 50 in a position.

With reference to FIG. 4, an elongate securing bore 22 is extended through the arm portion 20 from the central portion 14 to the mount member 40 and opens into the mount bore 43 of the mount member 50 opposite the elongate groove 44. The ridge 58 and groove 44 of the sleeve 50 and mount member 40 are designed for keeping the lock holes 59 of sleeve 50 in line with securing bore. An elongate securing pin 23 is extended through the securing bore 22 with the first end 24 of the securing pin 23 being positioned towards the central portion 14 and the second end 25 of the securing pin 23 being extendable into the mount bore 43 such that the second end 25 is insertable into either of the lock holes 59 of the sleeve 50. Preferably, the first end 24 of the securing pin 23 also includes a knob 26 extending therefrom past the central portion 14 end of the securing bore 22. A first biasing assembly 15 biases the second end 25 of the securing pin 23 towards the mount bore 43. Preferably, the first biasing assembly 15 is positioned towards the first end 24 of the securing pin 23 and includes a spring 16 interposed between a pair of washers 19 housed within a threaded bushing 17 disposed around the first end 24 of the securing pin 23 and coupled to the central portion 14 end of the securing bore 22, and a snap washer 18 being inserted into washer groove 27 on the securing pin 23 to hold the first spring 16 within the threaded housing 17.

Figure 10:
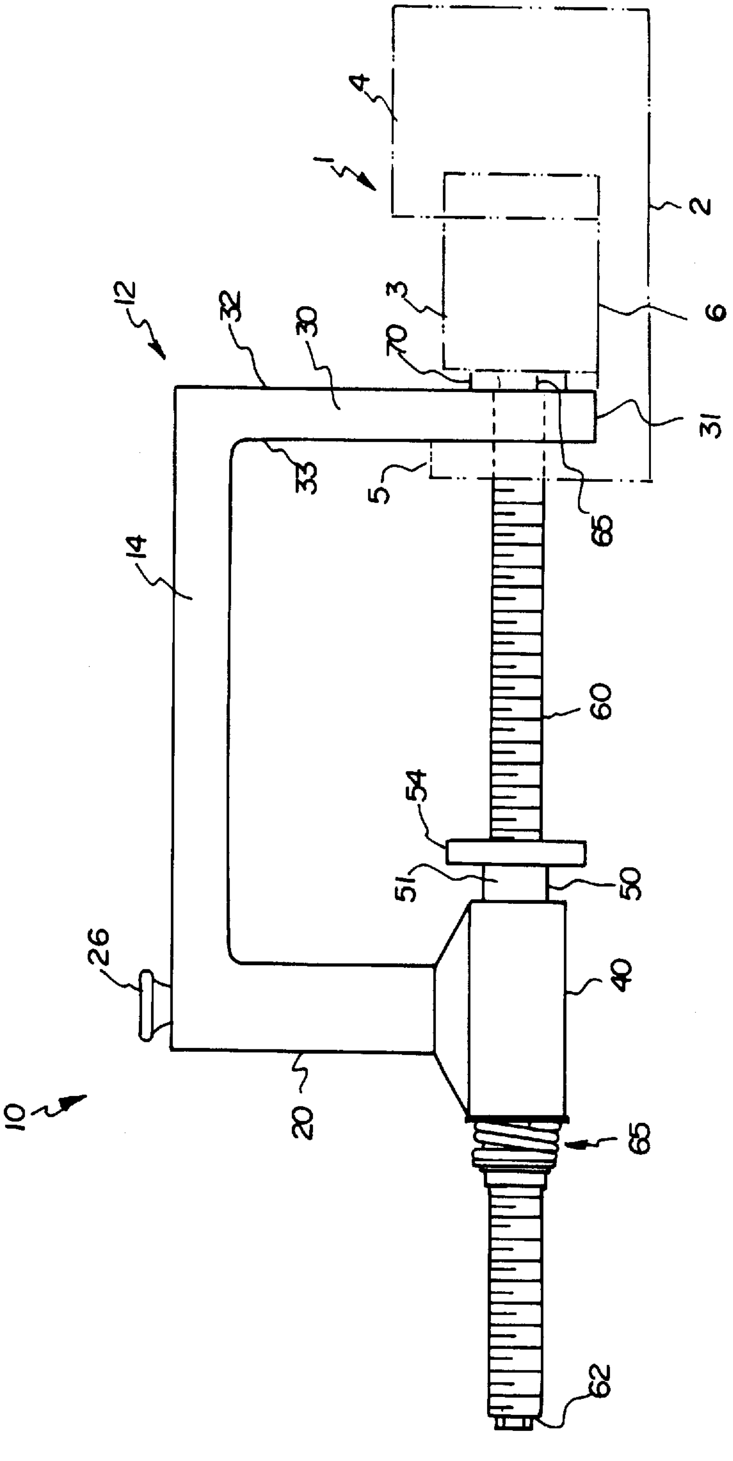
FIG. 10 is a schematic side view of the present invention with the sleeve in the extended position.

The sleeve 50 is positionable within the mount bore 43 between an extended position (as illustrated in FIG. 10) and a retracted position (as illustrated in FIG. 1). When in the retracted position, the radial flange 54 abuts the proximal end 41 of the mount member 40 while, in the extended position, the flange 54 is positioned closer towards the foot portion 30. The second end 25 of the securing pin 23 is insertable within one of the holes 59 of the sleeve 50 when the sleeve 50 is in the extended position and is insertable within the other hole 59 of the sleeve 50 when the sleeve 50 is in the retracted position.

With particular reference to FIG. 4, the elongate threaded rod 60 is threadingly extended through the threaded lumen 53 of the sleeve 50 with the distal end 62 of the threaded rod 60 extending from the distal end 52 of the sleeve 50 and the proximal end 61 of the rod 60 extending from the proximal end 51 of the sleeve 50. The threaded rod 60 is threaded through the lumen 53 so that the rod 60 is threadably extendable towards the foot portion 30. The proximal end 61 is designed for extending through the opening of the side wall 5 of the caliper body 2 into the channel 6 of the caliper body 2 to abut or engage the piston 3 of a brake disc assembly 1 so that the piston 3 can be positioned within the piston cylinder 4 of the caliper body 2. Preferably, the proximal end 61 of the threaded rod 60 includes a rectangular stub 63 extending therefrom. Ideally, the distal end 62 of the threaded rod 60 includes a hex stub 64 for permitting engagement by a wrench (or ratchet) device thereon for extending the threaded rod 60 towards and away from the foot portion 30.

A second biasing assembly 65 biases the sleeve 50 away from the foot portion 30 for permitting disengagement of the proximal end 61 of the rod 60 from a piston 3 in the piston cylinder 4 of a caliper body 2. The second biasing assembly 65 preferably includes a spring 66, a stop washer 67, an end washer 68, and a snap ring 69. The stop washer 67 is disposed around the distal portion 56 of the sleeve 50 so that it abuts the distal end 42 of the mount member 40 and so that it also abuts the abutment 57 of the sleeve 50 when the sleeve 50 is positioned in the retracted position (as shown in FIGS. 1 and 4). The snap ring 69 is disposed around the distal portion 56 of the sleeve 50 and is positioned in a radial groove 49 extending around outer surface of the distal portion 56 of the sleeve 50. The spring 66 of the second biasing assembly 65 is disposed around the distal portion 56 of the sleeve 50 so that it is interposed between the stop washer 67 and the snap ring 69 of the second biasing assembly. The end washer 68 is disposed around the distal portion 56 of the sleeve 50 and interposed between the spring 66 and the snap ring 69.

Figure 3:
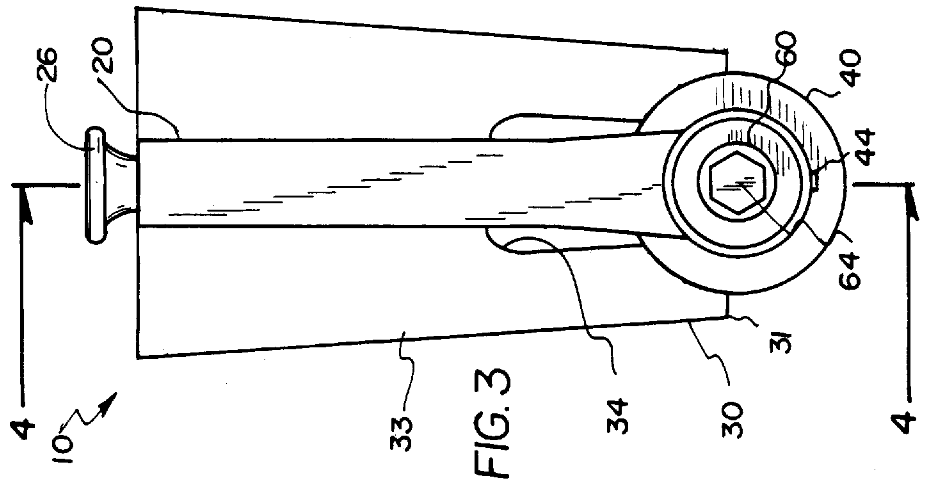
FIG. 3 is a schematic top side view of the present invention.
Figure 5:
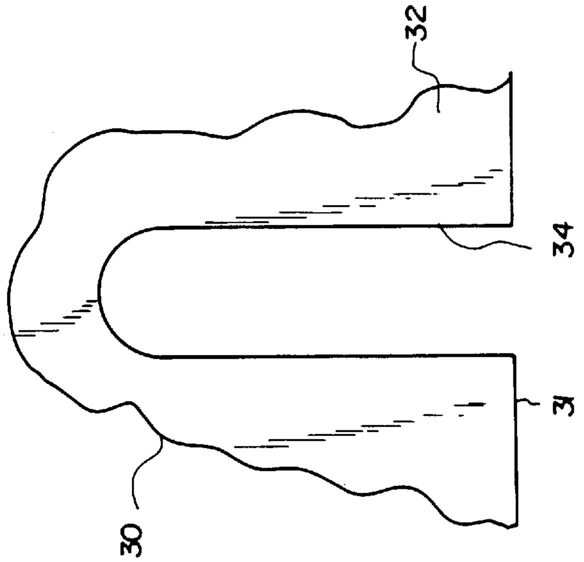
FIG. 5 is a schematic breakaway bottom side view of the slot of the foot portion of the present invention taken from line 5—5 of FIG. 1.
Figure 7:
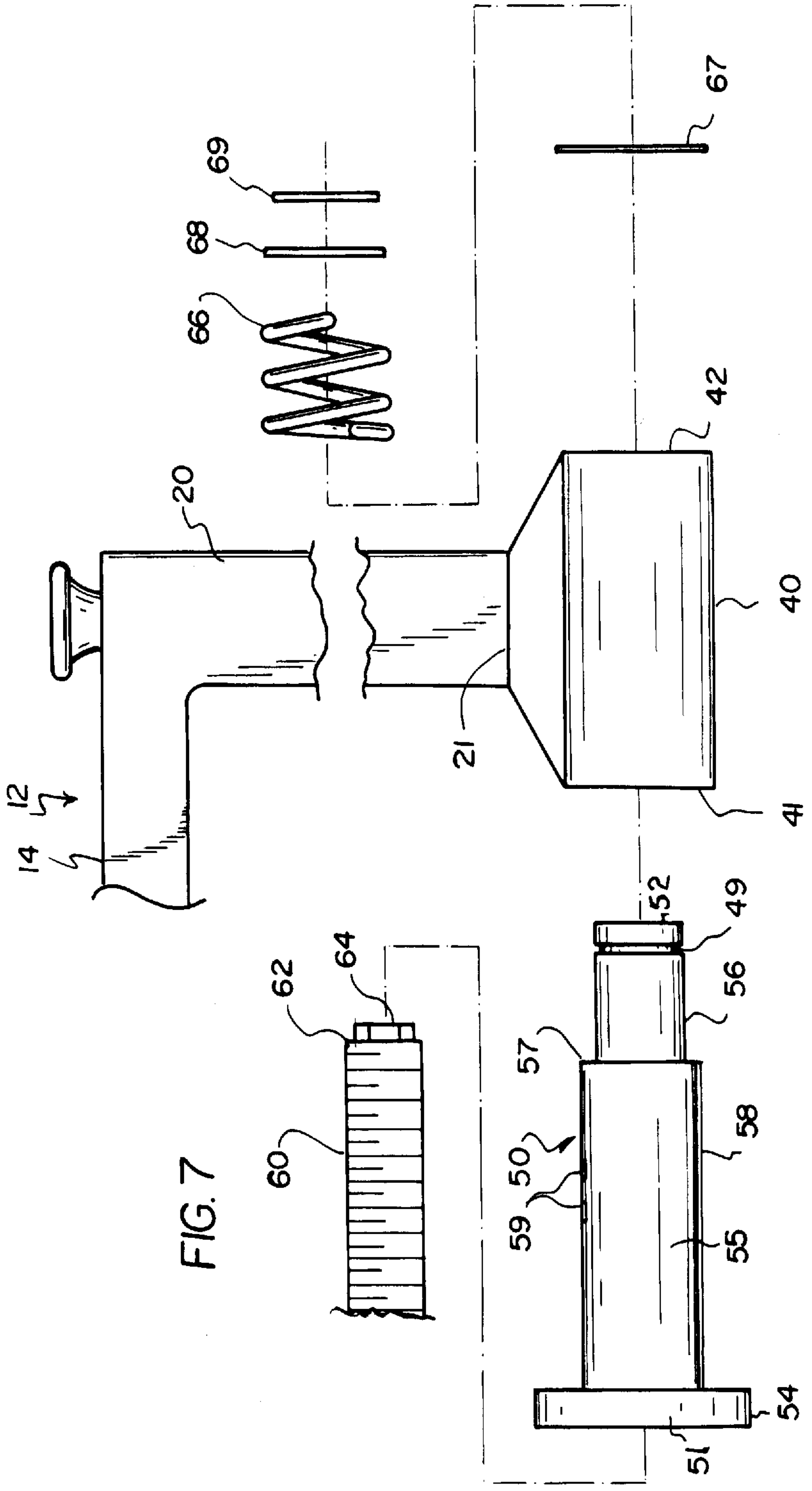
FIG. 7 is a schematic exploded side view of the mount member region of the present invention.
Figure 8:
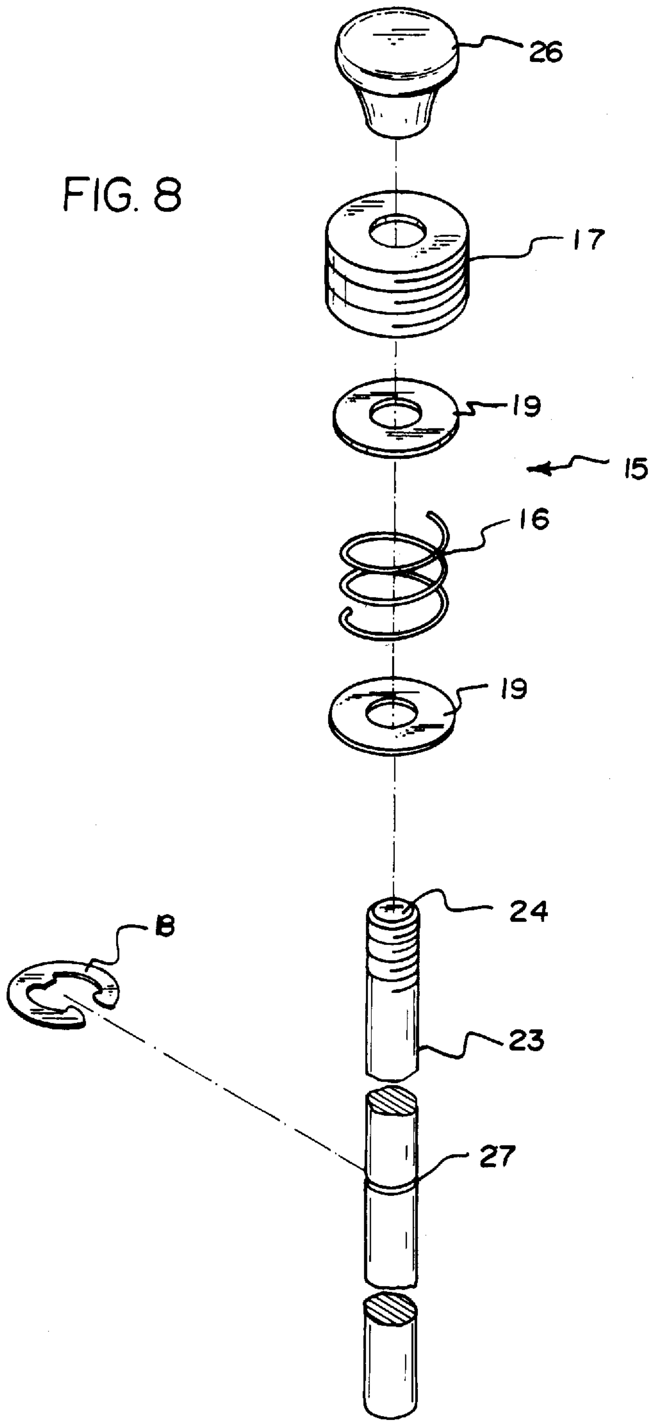
FIG. 8 is a schematic partial exploded perspective view of one end of the securing pin of the present invention.

As best illustrated in FIGS. 1, 3 and 5, the foot portion 30 has proximal and distal surfaces 32,33, and a generally U-shaped slot 34 therethrough between the surfaces 32,33. The slot 34 is extended from the terminal end 31 of the foot portion 30 towards the central portion 14. As shown in FIG. 10, the foot portion 30 is designed for insertion into the channel 6 of the caliper body 2 of a disc brake assembly 1 between the side wall 5 of the caliper body 2 and the piston 3 of the disc break assembly 1 so that the distal surface 33 of the foot portion 30 is abutted to the side wall 5 of the caliper body 2. The threaded lumen 53 of sleeve 50 is generally aligned with the slot 34 such that the longitudinal axis of the lumen 53 extends through a portion of the slot 34 so that the proximal end 61 of the threaded rod 60 is extendable through the slot 34 to engage a piston 3 of a disc brake assembly.

Figure 6:
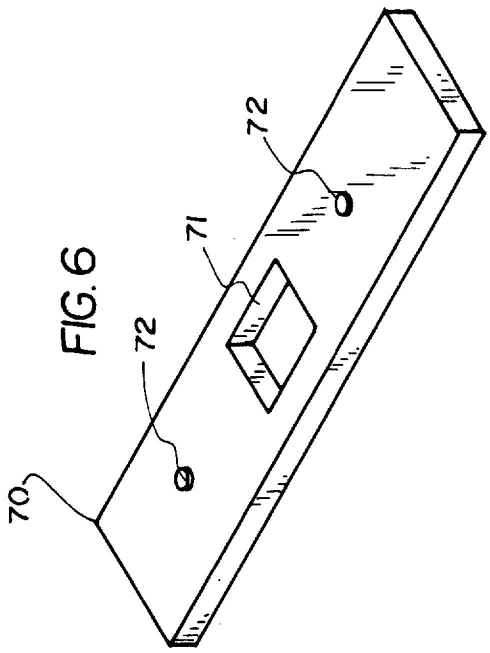
FIG. 6 is a schematic perspective view of the piston adapter plate of the present invention.

Ideally, as seen in FIG. 6, the tool 10 also includes a generally rectangular piston adapter plate 70 which has a mounting hole 71 interposed between a pair of guide pin holes 72. The piston adapter plate 70 is mountable to the proximal end 61 of the threaded rod 60 such that the stub 63 of the proximal end 61 is inserted into the mounting hole 71. The piston adapter plate 70 is designed for abutting commonly found pistons 3 of disc brake assemblies 1 so adapted to have a groove at its exposed end to accept the plate 70 therein.

In use, the tool 10 is used to position a piston 3 of a disc brake assembly 1 into the piston cylinder 4 of the caliper body 2 of the disc brake assembly 1 to achieve proper clearance to install a brake pad on to the disc brake assembly 1. The sleeve 50 of the tool is first positioned into the extended position (as seen in FIG. 10) and the terminal end 31 of the foot portion 30 is inserted into the channel 6 of the caliper body 2 between the piston 3 and the side wall 5 so that the slot 34 of the foot portion 30 is aligned with the opening (not shown) through the side wall 5 and the bore of the piston cylinder 4 of the caliper body 2 and the distal surface 33 of the foot portion is abutted against the inside of the side wall 5. The rod 60 is threadably extended through the opening in the side wall 5 and through the slot 34 of the foot portion until it engages the piston 3. For so designed pistons 3, the piston adapted plate 70 may also mounted to the proximal end 61 of the rod 60 before it engages the piston 3. The rod 60 is then further extended through the foot portion 30 until the piston 3 is properly positioned within the piston cylinder 4 so that a brake pad (not shown) may be installed in the channel 6 between the side wall 5 and the piston 3. To disengage the rod 60 from the piston 3, the sleeve is slid back from the extended position into the retracted position so that the rod is disengaged. This sliding back of the position of the sleeve 50 helps prevent counter rotation of the piston 3 back into the channel 6 when the rod 60 is threadingly retracted therefrom.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A disc brake assembly tool for use with a disc brake assembly having a caliper body, a piston, and a break pad, the caliper body having a piston cylinder and a side wall, the piston cylinder being spaced apart from the side wall of the caliper body to define a channel for positioning the break pad, the side wall having an opening therethrough into the channel, the piston being disposable within the piston cylinder of the caliper body, the piston body being extendable into the channel of the caliper body, said disc brake assembly tool comprising:

a base having an elongate center portion, an arm portion, and a foot portion, said arm and foot portions each having a terminal end, said arm and foot portions being extended substantially perpendicular from said center portion, said arm portion being spaced apart from said foot portion;

a mount member being coupled to said terminal end of said arm portion, said mount member having proximal and distal ends, and a mount bore being extended therethrough;

a tubular sleeve having a threaded lumen, an outer surface, opposite proximal and distal ends, and proximal and distal portions, said sleeve being inserted through said mount bore, said proximal end of said sleeve being extended towards said foot portion, said distal portion of said sleeve being extended from said mount bore of said mount member, said lumen of said sleeve having a longitudinal axis being extended between said ends of said sleeve;

said proximal end of said sleeve having a radial flange being outwardly radially extended therefrom;

said sleeve being positionable within said mount bore between an extended position and a retracted position;

an elongate threaded rod having opposite proximal and distal ends, said threaded rod being threadingly extended through said threaded lumen of said sleeve, said distal end of said threaded rod extending from said distal end of said sleeve, said proximal end of said threaded rod extending from said proximal end of said sleeve, said threaded rod being extendable towards said foot portion;

a second biasing assembly biasing said sleeve away from said foot portion;

said foot portion having proximal and distal surfaces, and a slot therethrough between said surfaces of said foot portion, said slot of said foot portion being extended from said terminal end of said foot portion towards said central portion; and said threaded lumen of sleeve being aligned with said slot such that said longitudinal axis of said lumen of said sleeve extends through a portion of said slot of said foot portion, said proximal end of said threaded rod being extendable through said slot of said foot portion.

2. The tool of claim 1, wherein said mount bore is generally parallel with said central portion.

3. The tool of claim 1, wherein said mount bore has an elongate groove being extended along the length of said mount bore, wherein said outer surface of said proximal portion of said sleeve has an elongate ridge said ridge of said proximal portion of said sleeve being disposed within said groove of said mount bore.

4. The tool of claim 1, wherein said proximal and distal portions of said sleeve form and abutment therebetween.

5. The tool of claim 4, said outer surface of said distal portion of said sleeve has a radial groove, wherein said second biasing assembly has a second spring, a stop washer, and a snap ring;

said stop washer of said second biasing assembly being disposed around said distal portion of said sleeve, said stop washer abutting said distal end of said mount member, said stop washer abutting said abutment of said sleeve when said sleeve is positioned in said retracted position;

wherein said snap ring of said second biasing assembly is disposed around said distal portion of said sleeve and positioned in said radial groove of said distal portion of said sleeve; and wherein said second spring of said second biasing assembly is disposed around said distal portion of said sleeve and interposed between said stop washer of said second biasing assembly and said snap ring of said second biasing assembly.

6. The tool of claim 1, wherein said outer surface of said proximal portion of said sleeve has a pair of spaced apart holes, said holes of said proximal portion of said sleeve being positioned towards said arm portion of said base, one of said holes of said proximal portion of said sleeve being located towards said proximal end of said sleeve, an other of said holes of said proximal portion of said sleeve being located towards said distal end of said sleeve.

7. The tool of claim 6, wherein a securing bore is extended through said arm portion from said central portion to said mount member, said securing bore opening into said mount bore of said mount member.

8. The tool of claim 7, further comprising an elongate securing pin being extended through said securing bore, said securing pin having opposite first and second ends, said first end of said securing pin being positioned towards said central portion, said first end of said securing pin having a knob being extending therefrom, said second end of said securing pin being extendable into said mount bore such that said second end of said securing pin is insertable into one of said holes of said proximal portion of said sleeve.

9. The tool of claim 8, further comprising a first biasing assembly biasing said second end of said securing pin towards said mount bore of said mount member, said first biasing assembly being positioned towards said first end of said securing pin.

10. The tool of claim 8, wherein said second end of said securing pin is insertable within one of said holes of said proximal portion of said sleeve when said sleeve is in said extended position, said securing pin being insertable within the other hole of said proximal portion of said sleeve when said sleeve is in said retracted position.

11. The tool of claim 1, wherein said proximal end of said threaded rod has a stub extending therefrom.

12. The tool of claim 11, further comprising an piston adapter plate being generally rectangular and having a mounting hole interposed between a pair of guide pin holes, said piston adapter plate being mountable to said proximal end of said threaded rod such that said stub of said proximal end of said threaded rod is inserted into said mounting hole.

13. A disc brake assembly tool for use with a disc brake assembly having a caliper body, a piston, and a break pad, the caliper body having a piston cylinder and a side wall, the piston cylinder being spaced apart from the side wall of the caliper body to define a channel for positioning the break pad, the side wall having an opening therethrough into the channel, the piston being disposable within the piston cylinder of the caliper body, the piston body being extendable into the channel of the caliper body, said disc brake assembly tool comprising:

a base having an elongate center portion, an arm portion, and a foot portion, said arm and foot portions each having a terminal end, said arm and foot portions being extended substantially perpendicular from said center portion, said arm portion being spaced apart from said foot portion;

a mount member being coupled to said terminal end of said arm portion, said mount member having proximal and distal ends, and a mount bore being extended therethrough, said mount bore being generally parallel with said central portion, said mount bore having an elongate groove being extended along the length of said mount bore;

a tubular sleeve having a threaded lumen, an outer surface, opposite proximal and distal ends, and proximal and distal portions, said lumen of said sleeve having a longitudinal axis being extended between said ends of said sleeve, said proximal and distal portions of said sleeve forming and abutment therebetween, said sleeve being inserted through said mount bore, said proximal end of said sleeve being extended towards said foot portion, said distal portion of said sleeve being extended from said mount bore of said mount member;

outer surface of said proximal portion of said sleeve having an elongate ridge, said ridge of said proximal portion of said sleeve being disposed within said groove of said mount bore;

said outer surface of said proximal portion of said sleeve having a pair of spaced apart holes, said holes of said proximal portion of said sleeve being positioned towards said arm portion of said base one of said holes of said proximal portion of said sleeve being located towards said proximal end of said sleeve, an other of said holes of said proximal portion of said sleeve being located towards said distal end of said sleeve;

said proximal end of said sleeve having a radial flange being outwardly radially extended therefrom;

a securing bore being extended through said arm portion from said central portion to said mount member, said securing bore opening into said mount bore of said mount member;

an elongate securing pin being extended through said securing bore, said securing pin having opposite first and second ends, said first end of said securing pin being positioned towards said central portion, said first end of said securing pin having a knob being extending therefrom, said second end of said securing pin being extendable into said mount bore such that said second end of said securing pin is insertable into one of said holes of said proximal portion of said sleeve;

first biasing assembly biasing said second end of said securing pin towards said mount bore of said mount member, said first biasing assembly being positioned towards said first end of said securing pin;

said sleeve being positionable within said mount bore between an extended position and a retracted position, said second end of said securing pin being insertable within one of said holes of said proximal portion of said sleeve when said sleeve is in said extended position, said securing pin being insertable within the other hole of said proximal portion of said sleeve when said sleeve is in said retracted position;

an elongate threaded rod having opposite proximal and distal ends, said threaded rod being threadingly extended through said threaded lumen of said sleeve, said distal end of said threaded rod extending from said distal end of said sleeve, said proximal end of said threaded rod extending from said proximal end of said sleeve, said threaded rod being extendable towards said foot portion;

said proximal end of said threaded rod having a rectangular stub extending therefrom;

a second biasing assembly biasing said sleeve away from said foot portion, said second biasing assembly having a second spring, a stop washer, and a snap ring;

said stop washer of said second biasing assembly being disposed around said distal portion of said sleeve, said stop washer abutting said distal end of said mount member, said stop washer abutting said abutment of said sleeve when said sleeve is positioned in said retracted position;

said outer surface of said distal portion of said sleeve having a radial groove;

said snap ring of said second biasing assembly being disposed around said distal portion of said sleeve and positioned in said radial groove of said distal portion of said sleeve;

said second spring of said second biasing assembly being disposed around said distal portion of said sleeve and interposed between said stop washer of said second biasing assembly and said snap ring of said second biasing assembly;

said foot portion having proximal and distal surfaces, and a slot therethrough between said surfaces of said foot portion, said slot of said foot portion being extended from said terminal end of said foot portion towards said central portion;

said threaded lumen of sleeve being aligned with said slot such that said longitudinal axis of said lumen of said sleeve extends through a portion of said slot of said foot portion, said proximal end of said threaded rod being extendable through said slot of said foot portion; and an piston adapter plate being generally rectangular and having a mounting hole interposed between a pair of guide pin holes, said piston adapter plate being mountable to said proximal end of said threaded rod such that said stub of said proximal end of said threaded rod is inserted into said mounting hole.

* * * * *